Feb. 14, 1939.                O. SCHRIEVER ET AL                2,146,769
                SEPARATELY CONTROLLED RELAXATION OSCILLATOR
                           Filed Oct. 23, 1933
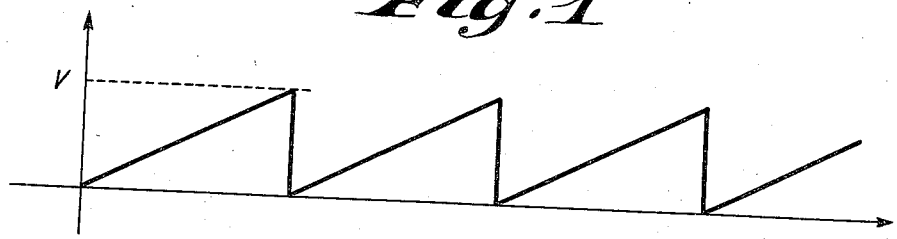
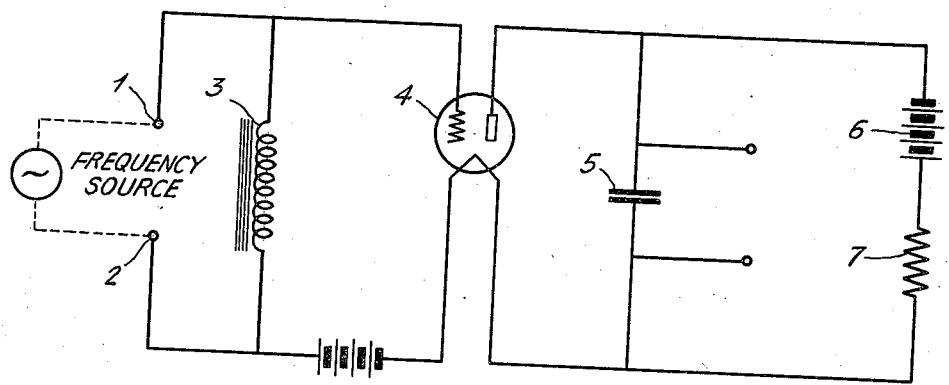
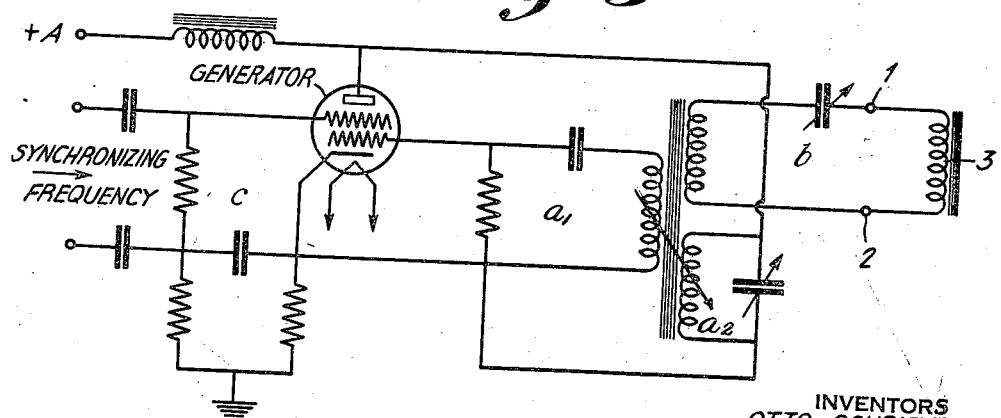
INVENTORS
OTTO SCHRIEVER
WOLFGANG FEDERMAN
BY
ATTORNEY Patented Feb. 14, 1939

2,146,769

UNITED STATES PATENT OFFICE 2,146,769

SEPARATELY CONTROLLED RELAXATION OSCILLATOR

Otto Schriever and Wolfgang Federmann, Berlin, Germany, assignors to Telefunken Gesellschaft für Drahtlose Telegraphie m. b. H., Berlin, Germany, a corporation of Germany Application October 23, 1933, Serial No. 694,758
In Germany November 8, 1932

1 Claim. (Cl. 250—36)

The use of the Braun tube as curve recorder or as television receiver with intensity control of the cathode ray presupposes a time proportional deviation of the luminous spot in one or two coordinates and a return of the same into the original position possibly without loss of time. It is known that it is ordinarily endeavored to attain this course of movement by means of so-called relaxation oscillations. An ideal relaxation oscillation has the shape shown in Figure 1; a condenser load increases from zero along a linear course in proportion with time until it reaches a maximum value V in order to suddenly drop back to zero and to increase anew.

In the known circuits for the production of relaxation oscillations, the discharge of a condenser has a principal relationship with its charge, namely, in that the discharge is released by means of a tube feed back circuit or a glow discharge path whereby this release occurs automatically by the charge voltage as soon as the latter has reached a predetermined value. The disadvantage of such circuit is to be seen in the fact that the tube properties affect essentially the curve shape and frequency thus making it difficult to realize a frequency constancy with which it may be safely operated.

To more fully describe and explain our invention, refer to the drawing of which:

Fig. 1 shows the wave form produced by the relaxation oscillator;

Fig. 2 shows a circuit diagram of the embodiment of the invention; and

Fig. 3 shows a modification of the invention.

The present invention avoids these difficulties in that the discharge is released by an automatical and periodical oscillation without involving a principal relationship with the charge voltage. Figure 2 explains the principle of the invention. An independently produced sinusoidal or approximately sinusoidal oscillation whose frequency is equal to the desired relaxation frequency, is applied to points 1, 2 of a self-inductance with iron core 3, which is so dimensioned that at the prevailing amperage, iron saturation exists during the greater part of each half cycle. The voltage at the terminals of the iron choke then presents, as is known, steep peaks during the passage of the current through zero, while this voltage remains negligibly small in comparison with these voltage peaks during the further course of each half cycle. In suitably choosing the alternating current amperage the duration of such voltage impulse can be made to amount to only a small fraction of the entire cycle of the control oscillation. In accordance with the present invention the voltage impulses thus produced are impressed upon the grid of a tube 4 which is blocked when inactive and serves as a discharge tube for the condenser 5. The charging of condenser 5 is effected by means of a voltage source 6 across a suitable resistance 7 which may consist of an ohmic resistance, the anode-cathode path of an electron tube, a glow lamp, a photo-cell or other suitable element. The functioning of the arrangement, it will be seen, is such that the charge of the condenser occurs while the parallel tube 4 is in the blocked stage, while the discharge takes place during the very short duration of the separately excited voltage peak. It is a particular characteristic feature of the present circuit, that in the absence of the controlling impulses the condenser is charged only up to the voltage of battery 6, without a discharge taking place. Contrary to this mode of operation, however, in the well known automatic relaxation discharges which are synchronized by means of a control frequency, the periodic action continues, even in the absence of controlling impulses, with any non-related natural frequency.

The production of the control oscillation applied to the terminals 1, 2, can be carried out in any suitable well known manner such as by means of a motor driven A. C. machine, light siren, tuning fork generator, pendulum transformer, tube generator or the like.

Although it is possible to obtain a great constancy of frequency for such generators, yet it is of advantage to so arrange the circuit that the frequency of the control oscillations follows automatically eventual frequency fluctuations of the oscillation to be registered (whether of the curve to be recorded by the oscillograph or of the line frequency of the television picture received). This is accomplished in accordance with the invention in applying the above oscillation to the local standard frequency generator in such manner that it retains its synchronism in the manner shown in Fig. 3. This can be carried out in any desired way, for example, in the case of a tube generator by utilizing the so-called drag effect, in the case of the pendulum transformer and the tuning fork by means of electro-magnetic influence upon the oscillating time.

Fig. 3 represents a twin grid tube generator adapted to produce approximately sinuous oscillations. The frequency of these oscillations is chosen equal to the desired relaxation wave frequency. Between the cathode and the grid which is adjacent to the cathode, is connected the grid circuit of the circuit arrangement capable of self-oscillation ($a_1$) and which is in regenerative coupling relation with the tuned plate circuit ($a_2$). The ensuing oscillations are derived across terminals 1 and 2 through the circuit (b). The roughly sinuous oscillations are thereupon fed to a choke coil 3 (Fig. 2). Inasmuch as the frequency of a self-excited generator is not sufficiently constant and stable to be utilized for picture telegraphic work, the generator additionally is controlled by the aid of a synchronizing wave transmitted from a remote point (transmitter end), and these synchronizing alternating voltages by way of filter and biasing-voltage circuit schemes are impressed upon the generator between cathode and the grid, which is adjacent to the plate (circuit c). What is utilized in this scheme is the so-called entrainment or coherence phenomenon, and as a result the frequency generated in the generator will always coincide with the synchronizing frequency.

In television reception the subject matter of the invention may, if desired, be used for the line frequency as well as for the picture frequency.

The discharge tube 4 of Figure 2 may be a high vacuum tube with one or several grids, a thyratron, a flow relay or the like.

We claim:

A relaxation oscillation generator comprising a discharge path including an electron discharge device having an anode, cathode and control electrode, a condenser in circuit with said anode and cathode, a source of direct current potential in shunt with said condenser for charging said condenser, said source having a potential value less than that necessary to initiate discharging of the condenser through the discharge path, a semi-saturated iron core inductance coil connected to said control electrode and cathode, and a source of control sinusoidal oscillations connected to said coil for lowering the point at which the discharge of the condenser is initiated.

OTTO SCHRIEVER.
WOLFGANG FEDERMANN.